US012139387B2

(12) United States Patent
Wolthers et al.

(10) Patent No.: US 12,139,387 B2
(45) Date of Patent: Nov. 12, 2024

(54) PRESSURE CONTROL DEVICE FOR A BEVERAGE CONTAINER

(71) Applicant: Heineken Supply Chain B.V., Amsterdam (NL)

(72) Inventors: Wolter Wolthers, Alphen aan de Rijn (NL); Rudolf Maria Pronk, Amstelveen (NL); Mark Erich Sillince, Ringwood (GB)

(73) Assignee: Heineken Supply Chain B.V., Amsterdam (NL)

( * ) Notice: Subject to any disclaimer, the term of this patent is extended or adjusted under 35 U.S.C. 154(b) by 259 days.

(21) Appl. No.: 17/596,125

(22) PCT Filed: Jun. 4, 2020

(86) PCT No.: PCT/NL2020/050362
§ 371 (c)(1),
(2) Date: Dec. 3, 2021

(87) PCT Pub. No.: WO2020/246884
PCT Pub. Date: Dec. 10, 2020

(65) Prior Publication Data

US 2022/0219884 A1 Jul. 14, 2022

Related U.S. Application Data

(60) Provisional application No. 62/856,955, filed on Jun. 4, 2019.

(30) Foreign Application Priority Data

Sep. 13, 2019 (NL) ...................................... 2023833

(51) Int. Cl.
*B65D 83/66* (2006.01)
*B67D 1/04* (2006.01)
*B67D 1/12* (2006.01)

(52) U.S. Cl.
CPC ......... *B67D 1/0406* (2013.01); *B67D 1/1252* (2013.01)

(58) Field of Classification Search
CPC ... B67D 1/0406; B67D 1/1252; B67D 1/0437
See application file for complete search history.

(56) References Cited

U.S. PATENT DOCUMENTS

2007/0248834 A1* 10/2007 Ishihara .................. C08L 53/02 252/188.28
2009/0236361 A1* 9/2009 Doelman ............. B65D 47/242 222/335

FOREIGN PATENT DOCUMENTS

AU 2010237145 A1 11/2011
EP 2036854 A2 3/2009
(Continued)

OTHER PUBLICATIONS

International Search Report issued for corresponding International Application No. PCT/NL2020/050362 dated Sep. 16, 2020, 5 pages.
(Continued)

*Primary Examiner* — Donnell A Long
(74) *Attorney, Agent, or Firm* — Banner & Witcoff, Ltd.

(57) ABSTRACT

A pressure control device for controlling a pressure in a beverage container comprises a gas filled pressure control chamber enclosed by a wall of the pressure control device. The wall has an inner surface facing the chamber and an outer surface facing away from the chamber, the inner surface and outer surface defining a thickness of the wall. A scavenger material is provided in the pressure control device for capturing gas that enters, during use, into the pressure control chamber. The scavenger material is distributed over the wall thickness with a predetermined concentration from
(Continued)

the inner surface towards the outer surface of the wall such that a rate of gas capture by the scavenger material changes over time.

15 Claims, 5 Drawing Sheets

(56) References Cited

FOREIGN PATENT DOCUMENTS

| | | | |
|---|---|---|---|
| JP | S52061815 | | 5/1977 |
| JP | 2002506782 | | 3/2002 |
| JP | 2008526631 | | 7/2008 |
| JP | 2010510138 | | 4/2010 |
| JP | 2018537261 | | 12/2018 |
| NZ | 556414 | A | 4/2010 |
| WO | 2006/091069 | A1 | 8/2006 |

OTHER PUBLICATIONS

Charles et al., "Absorption kinetics of oxygen and carbon dioxide scavengers as part of active modified atmosphere packaging," Journal of Food Engineering, 2006, 7 pages.

* cited by examiner

PRESSURE CONTROL DEVICE FOR A BEVERAGE CONTAINER

CROSS-REFERENCE TO RELATED APPLICATIONS

This application claims the benefit of International Application No. PCT/NL2020/050362 filed Jun. 4, 2020, which claims benefit to U.S. Provisional Application No. 62/856,955 filed Jun. 4, 2019 and Netherlands Application No. 2023833 filed Sep. 13, 2019.

FIELD OF INVENTION

The invention relates to a pressure control device for controlling a pressure in a beverage container. In particular, the invention relates to a pressure control device for controlling a pressure in a beverage container, the pressure control device comprising a gas filled pressure control chamber enclosed by a wall of the pressure control device, and a scavenger material provided in the pressure control device for capturing gas that enters, during use, into the pressure control chamber. The invention moreover relates to a beverage container.

BACKGROUND

In beverage containers a pressure control device may be provided to allow dispensing of the beverage contained in the beverage container in pressurized condition from the container. To this end a pressure control device usually enables release of a pressure medium such as gas from a compartment in or on the beverage container into the space in which the beverage of the beverage container is kept. For instance, the international patent application WO2006/091069 describes a pressure control device in a beverage container wherein the pressure control device contains a pressure control chamber with at least one movable wall part. The pressure control chamber is filled with a pressure control gas such as air. The movable wall part operates a valve mechanism such that if in a space in which the beverage of the beverage container is located a pressure change occurs in relation to a control pressure in the pressure control chamber, in particular a reduction of pressure resulting from beverage being dispensed, the movable wall part will change position and a valve mechanism will temporarily open. As a result, pressurised gas stored in a compartment in the beverage container flows from the compartment into the space holding the beverage. If the pressure in this space has, once again, the desired value, approximately equal to the control pressure, the movable wall part is pressed back into the initial position and the valve mechanism is closed. In order to reduce an undesired increase of the control pressure over time due to gas migrating from the surroundings, particularly the compartment with pressurised gas, into the pressure control chamber, a scavenger is included in the pressure control chamber to capture such gas. The provision of the scavenger in the known pressure control device proves effective in preventing an undesired increase of the pressure in the pressure control chamber. However, it has been observed that the scavenger provided in the chamber is so effective in capturing gas migrating into the pressure control chamber, that the control pressure in the chamber may actually decrease over time as the pressure control gas, e.g. air, may also leak from the control chamber.

BRIEF SUMMARY OF THE INVENTION

In accordance it is an object to provide a pressure control device which maintains an approximately equal control pressure for a longer period of time.

It is a particular object to provide a pressure control device that prevents an undesired decrease of the control pressure in the pressure control device.

It is a further object to provide a pressure control device which can be stored under atmospheric conditions for some time and, when subsequently used, has or will each time have a pre-selected control pressure in the pressure control chamber due to use.

At least a number of these and other objects are achieved with the provision of a pressure control device for controlling a pressure in a beverage container, the pressure control device comprising a gas filled pressure control chamber enclosed by a wall of the pressure control device, and a scavenger material provided in the pressure control device for capturing gas that enters, during use, into the pressure control chamber, wherein the wall has an inner surface facing the chamber and an outer surface facing away from the chamber, the inner surface and outer surface defining a thickness of the wall, wherein the scavenger material is distributed over the wall thickness with a predetermined concentration from the inner surface towards the outer surface of the wall such that a rate of gas capture by the scavenger material changes over time.

It was found that compared to the known pressure control device in which the scavenger is provided in the pressure control chamber a provision of the scavenger material in the wall of the pressure control device distributed over the wall thickness in a predetermined concentration provides better control over a gas capture rate by the scavenger material over time and thus better control over the control pressure in the chamber over time.

In particular, the predetermined concentration of the scavenger material distributed over the wall thickness can be taken such that the gas capture rate by the scavenger material decreases over time. For instance, scavenger material directly available for capturing gas in the pressure control chamber, i.e., scavenger material present in the wall near or at the inner face of the wall, may become limited over time resulting in a decrease of the gas capture rate. The predetermined concentration of the scavenger material can be taken such that the decrease in gas capture rate over time results in a net amount of gas migrating into the pressure control chamber, i.e., total amount of gas migrating into the pressure control chamber minus amount of gas captured by the scavenger material, over time which is approximately equal to the amount of pressure control gas, e.g. air, that leaks or escapes from the pressure control chamber in said time, thereby maintaining the pressure control approximately equal.

In a particular aspect the pressure control device has the scavenger material distributed over the wall thickness in a varying concentration. Thus, a concentration of the scavenger material in the wall at or near the inner face thereof may be higher or lower than a concentration of the scavenger material in the wall nearer to the outer face thereof. For instance, the concentration of scavenger material in the wall may increase from the inner face towards the outer face. Such increase in concentration of the scavenger material may compensate for a potential low diffusion rate of the gas migrating into the pressure control chamber in diffusing through the material of the wall.

The scavenger material may in another aspect of the pressure control device be distributed over the wall thickness in a constant concentration. Thus, a concentration of the scavenger material throughout the wall thickness may be approximately the same. Such constant concentration gives a better predictability of the resulting gas capturing rate of the scavenger material distributed over the thickness of the wall over time. Moreover, the wall can be readily made by mixing a suitable amount of the scavenger material with a base material to form the wall with the predetermined constant concentration.

For instance, in an aspect of the pressure control device the wall is made by injection moulding of an injection mouldable material mixed with the scavenger material.

The scavenger material is preferably provided in the pressure control device in an amount that maintains the desired gas capture of gas migrating into the pressure control chamber during a normal lifespan of the beverage container. The normal lifespan of a beverage container may depend on the actual beverage held in the beverage container, with varying beverages in containers having different shelf lives. For example, it may be desirable to maintain a desired gas capture of gas migrating into the pressure control chamber for at least 9 months, which is a frequent used shelf live for typical beverages in container such as beer. Thus, an amount of scavenger material provided in the wall and distributed over the wall thickness is preferably sufficient to maintain the desired gas capture of gas migrating into the pressure control chamber for at least 9 months. The amount of scavenger material may be based on a total amount of pressurized gas provided in the beverage container.

Preferably, the scavenger material is included in the wall of the pressure control device enclosing the gas filled pressure control chamber separate from the beverage to be dispensed to exclude a potential contamination of scavenger material in the beverage. For example, the wall of the pressure control device comprising the scavenger material may be a wall that is separate from a beverage container wall enclosing the space holding the beverage to be dispensed. The wall of the pressure control device comprising the scavenger material is preferably not in direct contact with the beverage held in the beverage container. In an aspect of the pressure control device the scavenger material is distributed over the wall thickness with a predetermined concentration from the inner surface towards the outer surface of the wall wherein the wall at a side comprising the outer surface is at least substantially free of scavenger material.

In an aspect of the pressure control device the scavenger material may be provided in a solid scavenger having various configurations. For example, the solid scavenger may be injection molded from a composition made of calcium hydroxide encapsulated in a polymeric material with a high permeation rate to carbon dioxide. The solid scavenger may for example have a ring-type configuration or a fin-type configuration. The compound which is being utilized to produce the solid molded scavengers is a low-density polyethylene that is being blended with 40% calcium hydroxide to produce a compounded material suitable for injection molding. A linear low-density polyethylene may also be used. With a pressure control device according to the invention, any suitable type of scavenger can be used, such as chemically binding, adsorbing and/or absorbing scavengers.

As a scavenger material, preferably, a scavenger material is used which is suitable for binding gas used as a pressure gas in a beverage dispensing device. For instance, in case of carbonated beverages, as a rule, a scavenger will be used which is suitable for capturing carbon dioxide.

A scavenger for use in a pressure control device according to the invention is preferably selected from the collection of $CO_2$ absorbing and/or absorbing agents, for instance carbon, in particular activated carbon, diatomaceous earth (kieselguhr) alumino silicates, zeolites or silicates, preferably $Ca(OH)_2$.

In a particular aspect of the pressure control device the wall is made of an injection mouldable material having a limited gas permeability for the gas that enters, during use, into the pressure control chamber. The wall allows gas migrating into the pressure control chamber to diffuse through the wall thickness to be captured by the scavenger material provided in the wall throughout the thickness thereof. A material that provides a limited gas permeability to the wall made of such material increases the time needed for the gas to permeate from the inner surface of the wall to deeper parts of the wall. Accordingly, the gas permeability of the wall affects the gas capturing rate of the scavenger material in the wall such that a more limited permeability results in a decrease in gas capture rate over time. A suitable injection mouldable material for the wall is a thermoplastic material, preferably low-density polyethylene (LDPE) or linear low-density polyethylene (LLDPE).

The wall preferably is made by injection moulding a mix of LDPE and $Ca(OH)_2$ or a mix of LLDPE and $Ca(OH)_2$. A ratio of the scavenger material to injection mouldable material is such that the wall comprises the scavenger material distributed over the wall thickness with a concentration from the inner surface towards the outer surface of the wall such that a rate of gas capture by the scavenger material decreases over time. The ratio of the scavenger material to injection mouldable material is preferably such that a total amount of the scavenger material in the wall is sufficient to maintain the desired gas capture of gas migrating into the pressure control chamber for a shelf live of the beverage container and/or sufficient to capture the total amount of the pressurized gas provided in the beverage container. For example by injection moulding the wall of the pressure control device with a mix of $Ca(OH)_2$ and LDPE in a weight ratio between approximately 30:70 to approximately 50:50, results in the pressure control device providing in most cases a desired approximately equal control pressure when used in a beverage container comprising a compartment filled with $CO_2$ as pressure gas for a duration exceeding the normal shelf live of the beverage container.

In an aspect of the pressure control device the wall has at least one movable wall part for operating a mechanism for opening and/or closing a gas supply opening of a gas holder.

A further aspect of the pressure control device has a first amount of the scavenger material provided in the wall in a layer at the inner surface to capture a first amount of the gas that enters, during use, into the pressure control chamber over a first time period, and at least a further amount of the scavenger material provided in the wall behind said layer to capture a further amount of the gas that enters, during use, into the pressure control chamber over a further time period following the first time period. The first amount of scavenger material in the layer at the inner surface may be smaller, equal or larger than the second amount of scavenger material provided in the wall behind said layer. For instance, the amount of scavenger material in the layer may be larger than the second amount to provide the pressure control device with a relatively high gas capture rate in a first period of use, e.g. when the amount of leak of pressure control gas out of the pressure control chamber is relatively low, wherein the gas capture rate most notably decreases at a later period of use, e.g. when the amount of leak of pressure control gas out of the pressure control chamber is increasing.

In a further aspect of the pressure control device the inner surface of the wall is shielded from direct exposure to gas in the pressure control chamber. For example, the wall may be provided with a layer of gas permeable material free of scavenger. Accordingly, gas migrating into the pressure control chamber first has to permeate or diffuse through such layer before there can be any scavenging of the gas by the scavenger material. The gas permeable material used for the layer may differ from the gas permeable material used for the wall or may be the same.

In another aspect of the pressure control device, the predetermined concentration of the scavenger material provided in the wall is based on a surface area to volume ratio of the pressure control chamber.

In a further aspect a beverage container is provided with a pressure control device according to the invention.

In a particular aspect the beverage container contains an effervescent beverage such as a malt-based beverage, for example beer, or an apple-based beverage, for example cider.

These and other aspects of the pressure control device and the beverage container of the present invention are hereinafter further elucidated in the below description of a specific embodiment of a pressure control device that achieves at least a number of these and other objects described herein.

DETAILED DESCRIPTION

In the specific embodiment of the pressure control device in accordance with the invention a gas filled pressure control chamber is provided enclosed by an injection moulded wall. The wall comprises at least one movable wall part, i.e., a piston, for operating a mechanism for opening and/or closing a gas supply opening of a gas holder as described in WO2006/091069. For comparative purposes a pressure control device as described in WO2006/091069 as well as a pressure control device having no scavenger material are also provided. The embodiments of the pressure control devices differ from each other in that in the known pressure control devices there is no amount of $Ca(OH)_2$ provided, so that a scavenging reaction of gas does not take place, or an amount of $Ca(OH)_2$ is provided in the pressure control chamber directly exposed to $CO_2$ gas migrating into the chamber, so that a reaction between the gas and scavenger $Ca(OH)_2$ is unhindered, whereas in the specific embodiment of the pressure control device according to the invention the injection moulded wall is made of a mix of $Ca(OH)_2$ and LDPE in a weight ratio of approximately 40:60, so that the $Ca(OH)_2$ is distributed over the wall thickness in an approximately constant predetermined concentration.

Figure 6:
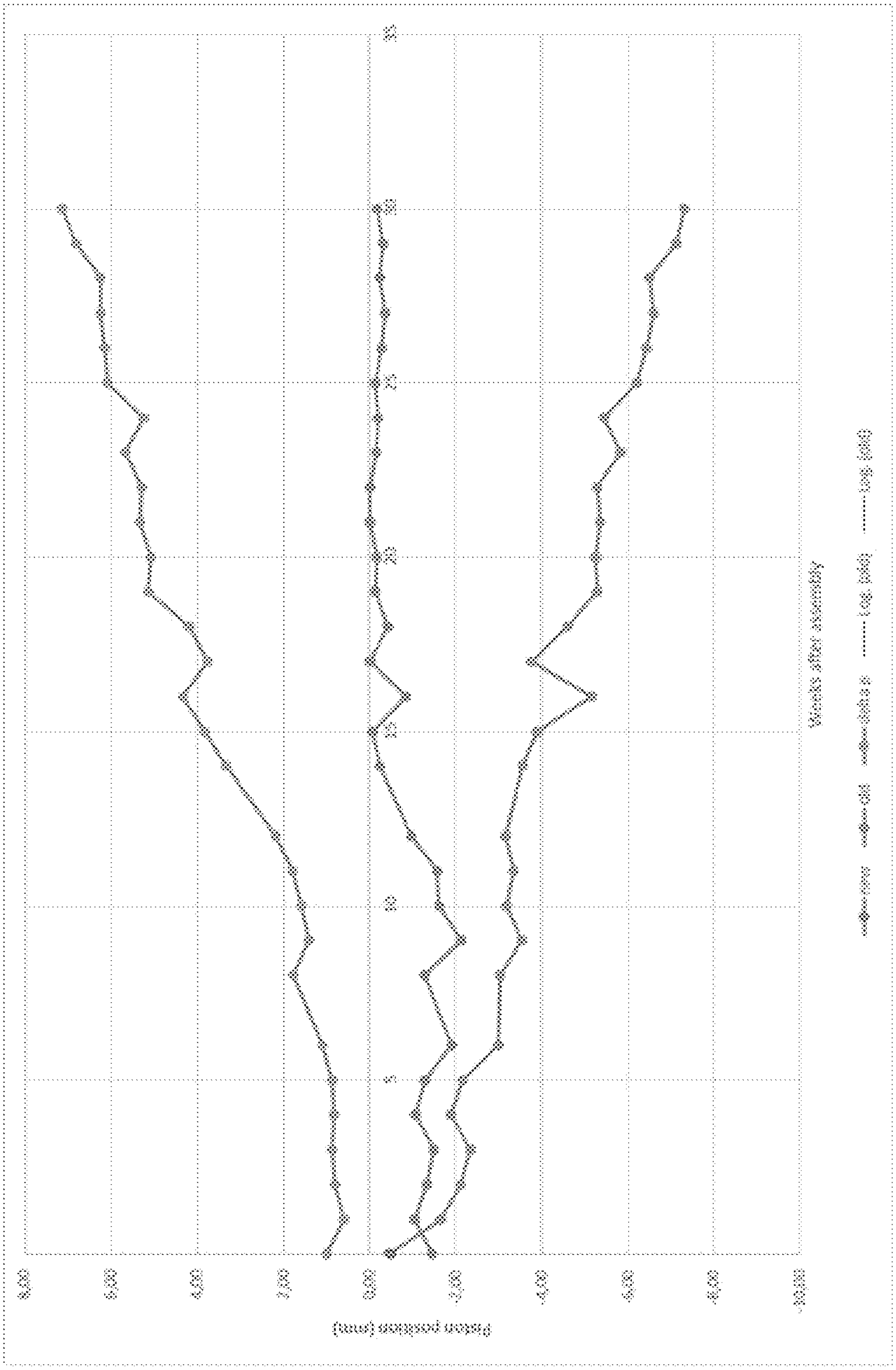
FIG. 6 is a graph showing a deviation of piston position over time for three pressure control devices.

These pressure control devices were tested to compare their ability to maintain an approximately equal control pressure for a longer period of time. For a period of 30 weeks from assembly of the pressure control devices a position of the piston was checked weekly as representative for an actual control pressure in the pressure control chamber. A deviation of the piston position compared to a reference position of the piston (0 mm) at predetermined control pressure was measured in mm's, with a positive value representing an extended position of the piston reflecting a pressure increase in the pressure control chamber and a negative value representing a pressure decrease in the pressure control chamber. The results for each of the pressure control devices is shown in the graph in FIG. 6.

The upper line in the graph is the result of the pressure control device without $Ca(OH)_2$. It demonstrates an almost linear increase in pressure over the 30 weeks, which is due to $CO_2$ gas migrating into the pressure control chamber. The lower line in the graph is the result of the pressure control device with $Ca(OH)_2$ powder provided in the pressure control chamber. It demonstrates an almost linear decrease in pressure over the 30 weeks, which is due to effectively all $CO_2$ gas migrating into the pressure control chamber being directly exposed to the $Ca(OH)_2$ powder and reacting therewith, while the control pressure gas in the pressure control chamber leaks from the chamber. The middle line in the graph is the result of the pressure control device according to the present invention with $Ca(OH)_2$ distributed over the wall thickness. It demonstrates an almost constant piston position and thus control pressure in the pressure control chamber over the 30 weeks. This is due to the leak of pressure gas from the pressure control chamber being compensated by an increase in $CO_2$ in the chamber as the $Ca(OH)_2$ distributed over the wall thickness provides a decreased $CO_2$ capture rate. At the 20 weeks mark gas in the pressure control chamber was analyzed and showed to comprise approximately 10 vol. % $CO_2$.

Figure 1:
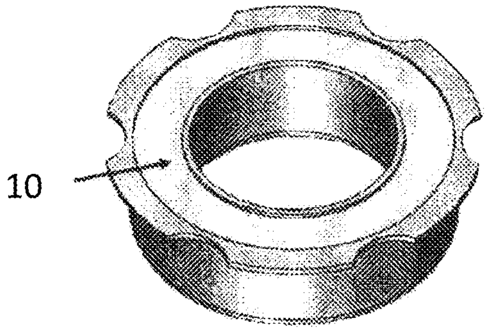
FIG. 1 shows a first example scavenger.
Figure 2:
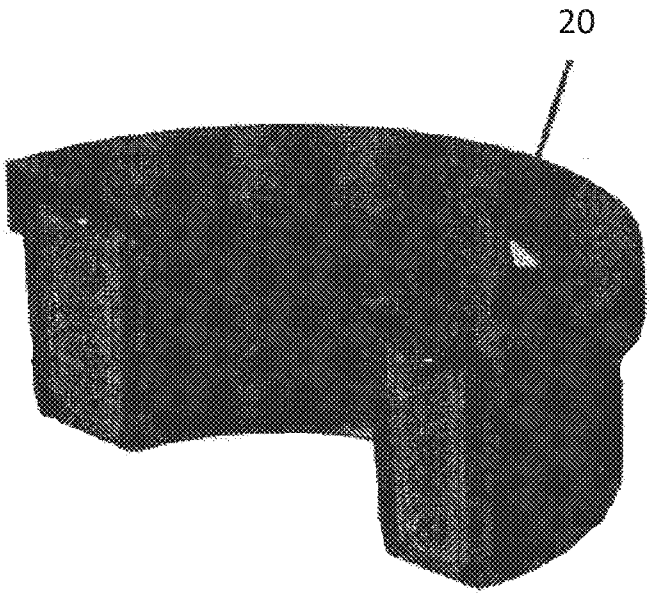
FIG. 2 shows a second example scavenger.

An embodiment of a scavenger 10 for use in a pressure control device according to the invention is shown in FIG. 1 in a perspective view. The scavenger 10 is a solid scavenger including a carrier molded using polypropylene and a solid ring of calcium hydroxide contained within the carrier. The process of manufacturing the scavenger is not practical and dust occurs such that personnel creating the product has to have protective masks and clothing. Another embodiment of a scavenger 20 for use in a pressure control device according to the invention, as shown in FIG. 2 in a cross-sectional perspective view, is made using over molding where the polypropylene has openings therein so that the carbon dioxide is exposed to the compacted calcium hydroxide.

Preferably the creation of these scavengers 10, 20 using calcium hydroxide involves providing a polymeric material with a high permeation rate to carbon dioxide and then have calcium hydroxide material encapsulated in the polymer. This compound then provides a material which can be injection molded to produce solid scavengers.

Figure 3A:
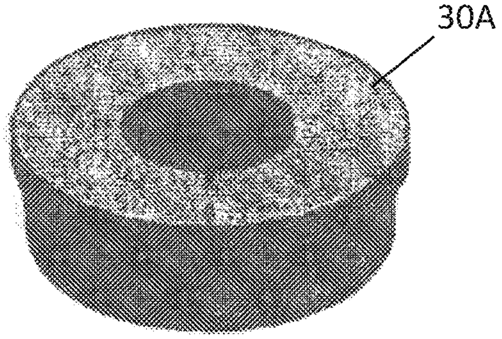
FIG. 3A shows a third example scavenger.
Figure 3B:
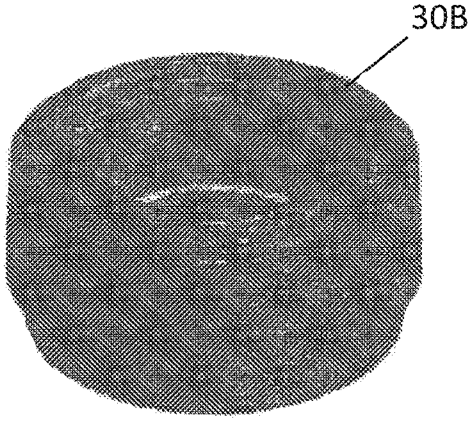
FIG. 3B shows a fourth example scavenger.
Figure 3C:
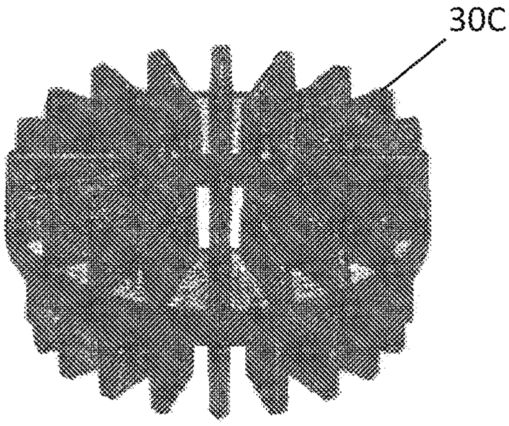
FIG. 3C shows a fifth example scavenger.

FIGS. 3A,3B,3C show perspective views of other embodiments of solid scavengers 30A, 30B, 30C, which have various configurations. For example, the solid scavenger 30A shown in FIG. 3A has a ring-type configuration, and the solid scavenger 30B shown in FIG. 3B has a fin-type configuration.

Figure 4A:
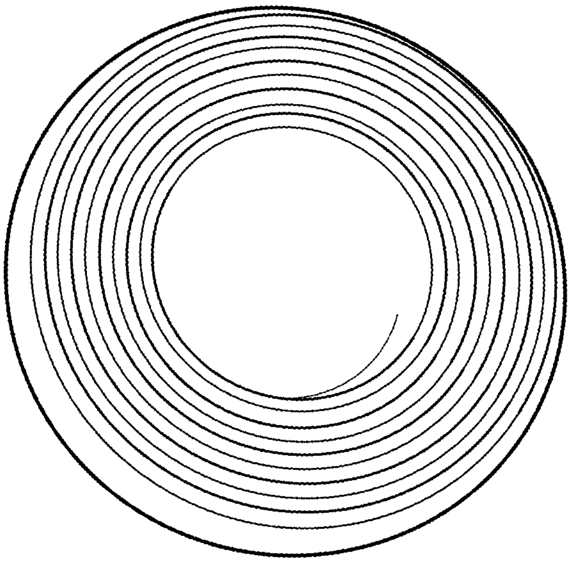
FIG. 4A shows a sixth example scavenger.
Figure 5A:
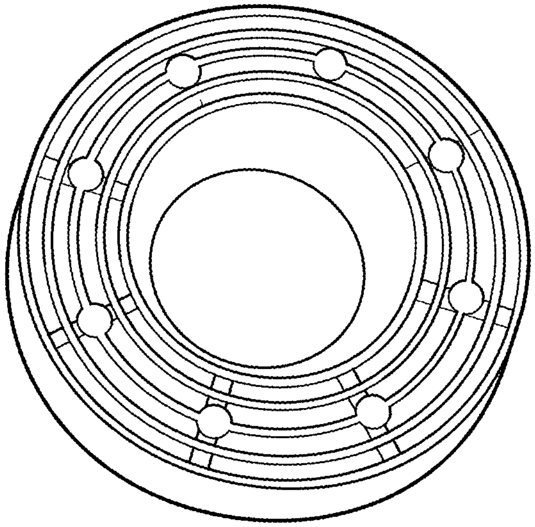
FIG. 5A shows a seventh example scavenger.

Referring to FIG. 4A, a preferred embodiment of a solid scavenger 40A is shown with the molded compound of the polymeric material in the calcium hydroxide. As is therein shown, there are six rings of material which provide a large surface area which can be contacted by the carbon dioxide and, as a result of the thickness, the carbon dioxide permeates and is absorbed. Also, as shown in FIG. 5A, there is a similar solid scavenger 50A which has ribs interconnecting the circular rings of the molded material. The ideal wall of thickness of the rings is approximately 0.5 millimeters and can be between 0.2 and 0.8 millimeters to obtain better penetration of the carbon dioxide.

For the purpose of clarity and a concise description, features are described herein as part of the same or separate aspects and preferred embodiments thereof, however, it will be appreciated that the scope of the invention may include embodiments having combinations of all or some of the features described.

The invention claimed is:

1. A pressure control device for controlling a pressure in a beverage container, the pressure control device comprising a gas filled pressure control chamber enclosed by a wall of the pressure control device, and a scavenger material provided in the pressure control device for capturing gas that enters, during use, into the pressure control chamber, wherein the wall has an inner surface facing the chamber and an outer surface facing away from the chamber, the inner surface and outer surface defining a thickness of the wall, wherein the scavenger material is distributed over the wall thickness with a predetermined concentration from the inner surface towards the outer surface of the wall such that a rate of gas capture by the scavenger material changes over time.

2. The pressure control device according to claim 1, wherein the scavenger material is distributed over the wall thickness in a varying concentration.

3. The pressure control device according to claim 1, wherein the scavenger material is distributed over the wall thickness in a constant concentration.

4. The pressure control device according to claim 1, wherein the wall is made by injection moulding of an injection mouldable material mixed with the scavenger material.

5. The pressure control device according to claim 4, wherein the injection mouldable material is a material having a limited gas permeability for the gas that enters, during use, into the pressure control chamber.

6. The pressure control device according to claim 4, wherein the injection mouldable material is a thermoplastic material.

7. The pressure control device according to claim 6, wherein the thermoplastic material comprises low-density polyethylene (LDPE) or linear low-density polyethylene (LLDPE).

8. The pressure control device according to claim 1, wherein the wall has at least one movable wall part for operating a mechanism for opening and/or closing a gas supply opening of a gas holder.

9. The pressure control device according to claim 1, wherein a first amount of the scavenger material is provided in the wall in a layer at the inner surface to capture a first amount of the gas that enters, during use, into the pressure control chamber over a first time period, and at least a further amount of the scavenger material provided in the wall behind said layer to capture a further amount of the gas that enters, during use, into the pressure control chamber over a further time period following the first time period.

10. The pressure control device according to claim 1, wherein the predetermined concentration of the scavenger material provided in the wall is a concentration adapted to a surface area to volume ratio of the pressure control chamber.

11. A beverage container provided with a pressure control device in accordance with claim 1.

12. The beverage container according to claim 11, wherein the beverage container contains an effervescent beverage such as a malt based beverage, for example beer, or an apple based beverage, for example cider.

13. The beverage container according to claim 12, wherein the effervescent beverage comprises a malt-based beverage or an apple-based beverage.

14. The beverage container according to claim 13, wherein the effervescent beverage comprises the malt-based beverage, and the malt-based beverage is beer.

15. The beverage container according to claim 13, wherein the effervescent beverage comprises the apple-based beverage, and the apple-based beverage is cider.

* * * * *